US012780700B2

(12) United States Patent
Lin et al.

(10) Patent No.: US 12,780,700 B2
(45) Date of Patent: Nov. 3, 2026

(54) METHOD FOR TREATING WASTEWATER CONTAINING TRIAZOLE COMPOUNDS

(71) Applicant: MEGA UNION TECHNOLOGY INC., Taoyuan City (TW)

(72) Inventors: Kuo-Ching Lin, Taoyuan City (TW); Yung-Cheng Chiang, Taoyuan City (TW); Shr-Han Shiu, Taoyuan City (TW); Meng-Chih Chung, Taoyuan City (TW); Yi-Syuan Huang, Taoyuan City (TW)

(73) Assignee: MEGA UNION TECHNOLOGY INC., Taoyuan City (TW)

( * ) Notice: Subject to any disclaimer, the term of this patent is extended or adjusted under 35 U.S.C. 154(b) by 349 days.

(21) Appl. No.: 18/241,006

(22) Filed: Aug. 31, 2023

(65) Prior Publication Data

US 2024/0092665 A1 Mar. 21, 2024

(30) Foreign Application Priority Data

Aug. 31, 2022 (TW) .................................. 111132986

(51) Int. Cl.

| | |
|---|---|
| ***C02F 1/76*** | (2023.01) |
| ***C02F 1/66*** | (2023.01) |
| ***C02F 5/10*** | (2023.01) |
| *C02F 101/38* | (2006.01) |
| *C02F 103/34* | (2006.01) |

(52) U.S. Cl.

CPC .................. *C02F 1/76* (2013.01); *C02F 1/66* (2013.01); *C02F 5/105* (2013.01); *C02F 2101/38* (2013.01); *C02F 2103/34* (2013.01); *C02F 2209/06* (2013.01); *C02F 2301/06* (2013.01)

(58) Field of Classification Search

None

See application file for complete search history.

(56) References Cited

U.S. PATENT DOCUMENTS

| | | | | |
|---|---|---|---|---|
| 2017/0356093 | A1 | 12/2017 | Kalakodimi et al. | |
| 2020/0377392 | A1* | 12/2020 | Frail | C23F 11/149 |

FOREIGN PATENT DOCUMENTS

| | | | |
|---|---|---|---|
| CN | 1406484 | A | 4/2003 |
| CN | 104692566 | A | 6/2015 |
| CN | 106794397 | A | 5/2017 |
| CN | 111233126 | A | 6/2020 |
| CN | 111573913 | A | 8/2020 |
| CN | 113428970 | A | 9/2021 |
| CN | 114341062 | A | 4/2022 |
| EP | 0971049 | A1 | 1/2000 |
| JP | H09174070 | A | 7/1997 |

(Continued)

OTHER PUBLICATIONS

Nika et al. Journal of Hazardous Materials, 2017, 323, 400-413. (Year: 2017).*

(Continued)

*Primary Examiner* — Clare M Perrin

(74) *Attorney, Agent, or Firm* — MUNCY, GEISSLER, OLDS & LOWE, P.C.

(57) ABSTRACT

A method for treating wastewater containing triazole compounds is provided. Hypochlorous acid (HOCl) having a neutral to slightly acidic pH value is added to the wastewater containing triazole compounds for reaction, thereby effectively reacting more than 90% of triazole compounds.

8 Claims, 1 Drawing Sheet

(56) References Cited

FOREIGN PATENT DOCUMENTS

| | | | |
|---|---|---|---|
| TW | 202110749 | A | 3/2021 |
| WO | WO2001/042149 | A1 | 6/2001 |
| WO | WO2019/173123 | A1 | 9/2019 |
| WO | WO2022/070451 | A1 | 4/2022 |

OTHER PUBLICATIONS

Yang et al. (Science of the Total Environment, 2021, 760, 144304). (Year: 2021).*

* cited by examiner

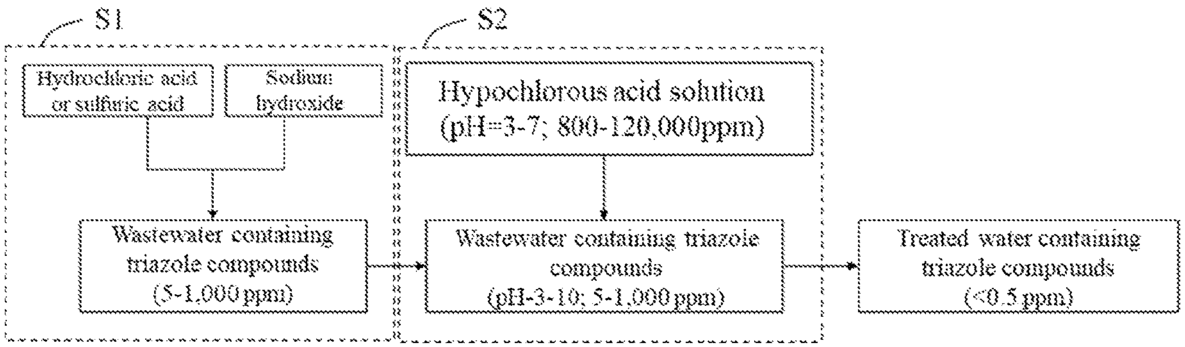
S1
S2
Hydrochloric acid or sulfuric acid
Sodium hydroxide
Hypochlorous acid solution (pH=3-7; 800-120,000ppm)
Wastewater containing triazole compounds (5-1,000 ppm)
Wastewater containing triazole compounds (pH-3-10; 5-1,000 ppm)
Treated water containing triazole compounds (<0.5 ppm)

METHOD FOR TREATING WASTEWATER CONTAINING TRIAZOLE COMPOUNDS

BACKGROUND OF THE INVENTION

1. Field of the Invention

The present disclosure
re relates to a method for treating wastewater containing triazole compounds and, more particularly, to a method for treating wastewater containing triazole compounds with a hypochlorous acid solution.

2. Description of the Prior Art

General wafers, circuit boards, etc. are related to the electronic component manufacturing industry. The manufacture of electronic components, such as wafers or circuit boards, generates a large amount of wastewater containing triazole compounds. At present, the triazole compounds are degraded mostly by biological treatment procedures. However, this method is land-intensive and time-consuming.

SUMMARY OF THE INVENTION

In order to solve the above problems, the present disclosure provides a method for treating wastewater containing triazole compounds, the wastewater reacts with the hypochlorous acid (HOCl) having a neutral and slightly acidic pH value and triazole series compound, thereby effectively reacting and processing more than 90% of triazole substances.

The present disclosure provides a method for treating wastewater containing triazole compounds, including:

- adjusting pH value of a wastewater containing triazole compounds to be between pH 3~10; and
- adding hypochlorous acid solution to the wastewater for reacting and treating the triazole compound to a concentration lower than a critical concentration, wherein pH value of the hypochlorous acid solution is 3-7.

BRIEF DESCRIPTION OF THE DRAWINGS

The sole FIGURE is a flow chart of a method for treating wastewater containing triazole compounds of the present disclosure.

DESCRIPTION OF THE PREFERRED EMBODIMENTS

The present disclosure will be described in detail with embodiments and attached drawings below for a better understanding. In addition to the embodiments described in the specification, the present invention also applies to other embodiments. Further, any modification, variation, or substitution, which can be easily made by the persons skilled in that art according to the embodiment of the present invention, is to be also included within the scope of the present invention, which is based on the claims stated below. The definition of the patent scope shall be based on the scope of the claims. It should be noted that the drawings are only to depict the present invention schematically but not to show the real dimensions or quantities of the present invention. Besides, matterless details are not necessarily depicted in the drawings to achieve conciseness of the drawings.

Please refer to the sole FIGURE, which is a flow chart of a method for treating wastewater containing triazole compounds of the present disclosure. Firstly, adjusting pH value of the wastewater containing triazole compounds using hydrochloric acid, sulfuric acid, or sodium hydroxide solution until the pH value is pH3-10 (step S1). A concentration of triazole compounds in the wastewater ranges from 5-1,000 ppm, which the optimized test effect is achieved at 5-100 ppm. In some embodiments, the hypochlorous acid solution has a neutral and slightly acidic pH value of 3-7, which has an optimized reaction effect.

The pH value of wastewater containing triazole compounds can be adjusted by any known method in the art using hydrochloric acid, sulfuric acid, or sodium hydroxide solution until the desired pH value is reached. The amount of hydrochloric acid, sulfuric acid, or sodium hydroxide solution are added depending on the desired pH value.

Similarly, the pH value of hypochlorous acid solution can be adjusted by any known method in the art using hydrochloric acid, sulfuric acid, or sodium hydroxide solution until the desired pH value is reached. The amount of hydrochloric acid, sulfuric acid, or sodium hydroxide solution are added depending on the desired pH value. The hypochlorous acid, sulfuric acid, or sodium hydroxide solution is commercially available.

Next, the wastewater containing triazole compounds is reacted with hypochlorous acid solution (step S2). The pH value of the hypochlorous acid solution is 5-7, i.e. the concentration ranges from 800-120,000 ppm. The concentration ratio of the hypochlorous acid solution to the triazole compounds of the wastewater is 800-120000:5-1000. The volume ratio of the hypochlorous acid solution to the wastewater is 0.001-1:1. The temperature of the treating reaction is 20-40° C. and the pressure is an atmospheric pressure.

The termination condition of the reaction is that the concentration (or the critical concentration) of the triazole compounds is lower than 0.5 ppm. In some embodiments, the concentration (or the critical concentration) of the triazole compounds is less than 0.03 ppm. Therefore, the amount of hypochlorous acid solution are added depending on the concentration of the triazole compounds in the wastewater or the volume of the wastewater, until the concentration of the triazole compounds in the wastewater is reduced to the critical concentration.

Triazole compounds refer to methylbenzotriazole, benzotriazole, 1,2,4-triazole, or combinations thereof. The reaction product of methylbenzotriazole and hypochlorous acid and the reaction product of benzotriazole and hypochlorous acid are the same. The three reaction formulas are shown in Table 1 below.

TABLE 1

| Chemical structure of triazole compounds | Chemical structure of hypochlorous acid | Chemical structure of reaction product |
|---|---|---|
| 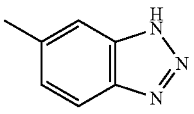 | 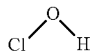 | 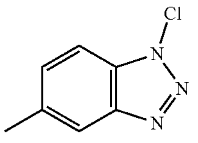 |
| Methylbenzotriazole | | 1-Chloro-5-methylbenzotriazole |

TABLE 1-continued

| Chemical structure of triazole compounds | Chemical structure of hypochlorous acid | Chemical structure of reaction product |
|---|---|---|
| | | 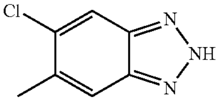 5-chloro-6-methyl-1H-benzotriazole |
| | | 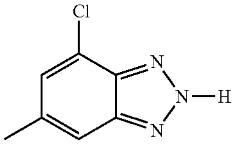 7-chloro-5-methyl-1H-benzotriazole |
| | | 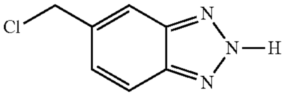 [SMILES: ClCc1ccc2n[nH]nc2c1] 5-(chloromethyl)-1H-benzotriazole |
| 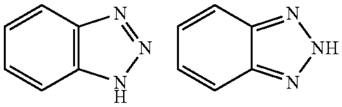 Benzotriazole | | 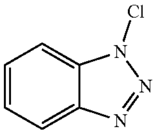 1-Chloro-1H-benzotriazole |
| | | 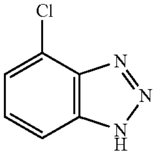 4-Chloro-1H-benzotriazole |
| | | 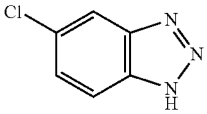 5-Chloro-1H-benzotriazole |
| 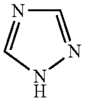 1,2,4-triazole | | 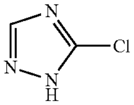 3-Chloro-1,2,4-triazole |
| | | 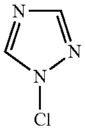 1-Chloro-1H-1,2,4-triazole |

Comparing the clearance rate of hypochlorous acid (Table 2) and hydrogen peroxide (Table 3) to triazole compounds, obviously, hypochlorous acid can effectively remove triazole compounds.

TABLE 2

| Experimental groups | T-450 | I | II |
|---|---|---|---|
| Hypochlorous acid (ppm) | — | 800 | 1,600 |
| Triazole compounds (ppm) | 10.53 | 2.14 | 0.03 |
| Clearance rate (%) | — | 79.73 | 99.69 |

TABLE 3

| Experimental groups | T-450 | I | II | III |
|---|---|---|---|---|
| Hydrogen peroxide (ppm) | — | 800 | 1,600 | 3,200 |
| Triazole compounds (ppm) | 16.1 | 16.1 | 16.0 | 16.0 |
| Clearance rate (%) | — | — | — | — |

What is claimed is:

1. A method for treating wastewater containing triazole compounds, comprising steps of:

adjusting pH value of a wastewater containing triazole compounds to be between pH 3~10, wherein an initial concentration of the triazole compounds in the wastewater ranges from 5-1000 ppm; and directly adding hypochlorous acid solution to the wastewater containing triazole compounds as a treating reactant for reacting and treating the triazole compound to a concentration lower than a critical concentration of 0.5 ppm, wherein pH value of the hypochlorous acid solution is 5-7, a concentration ratio of the hypochlorous acid solution to the triazole compounds of the wastewater is 800-120000:5-1000, and the triazole compound comprises methylbenzotriazole, benzotriazole, 1,2,4-triazole, or combinations thereof.

2. The method according to claim 1, wherein the pH value of the wastewater is adjusted by hydrochloric acid solution, sulfuric acid solution, sodium hydroxide solution, or a combination thereof.

3. The method according to claim 1, wherein a concentration of the hypochlorous acid solution is 800-120000 ppm.

4. The method according to claim 1, wherein a volume ratio of the hypochlorous acid solution to the wastewater is 0.001-1:1.

5. The method according to claim 1, wherein the critical concentration is 0.03 ppm.

6. The method according to claim 1, wherein an initial concentration of the triazole compound is 10-20 ppm.

7. The method according to claim 1, wherein a reaction temperature of the hypochlorous acid solution for treating the wastewater is 20-40° C.

8. The method according to claim 1, wherein a reaction pressure of the hypochlorous acid solution for treating the wastewater is an atmospheric pressure.

* * * * *